United States Patent [19]
Hauschild

[11] 3,977,539
[45] Aug. 31, 1976

[54] ARRANGEMENT FOR INSERTING PARTS TO BE MACHINED IN A CLAMPING FRAME

[75] Inventor: Wilhelm Hauschild, Feldkirchen, Germany

[73] Assignee: Schleif-u. Poliermaschinenbau GmbH, Germany

[22] Filed: Oct. 30, 1975

[21] Appl. No.: 627,028

Related U.S. Application Data
[63] Continuation of Ser. No. 430,058, Jan. 2, 1974, abandoned.

[30] Foreign Application Priority Data
Jan. 5, 1973   Germany............................ 2300440

[52] U.S. Cl.............................. 214/8.5 D; 214/309; 221/211; 271/9
[51] Int. Cl.².......................................... B65G 59/04
[58] Field of Search........... 214/8.5 R, 8.5 C, 8.5 D, 214/9, 309; 221/119, 211, 242; 271/9, 14, 171, 162, 164

[56] References Cited
UNITED STATES PATENTS
| | | | |
|---|---|---|---|
| 2,268,873 | 1/1942 | Hopkins | 221/242 |
| 3,586,191 | 6/1971 | Brown | 214/8.5 D X |

*Primary Examiner*—L. J. Paperner
*Assistant Examiner*—George F. Abraham
*Attorney, Agent, or Firm*—Max Fogiel

[57] ABSTRACT

An arrangement for inserting utensils or similar small parts in a clamping frame for machining purposes. Adjacent stacks of parts to be machined are held in a magazine. A gripper provided with gripping elements grips simultaneously the upper part in each of the adjacently-lying stacks. The gripper moves downward into the magazine and cooperates with a clamping frame which, when open, takes from the gripper the parts that it picked up.

13 Claims, 5 Drawing Figures

1

ARRANGEMENT FOR INSERTING PARTS TO BE MACHINED IN A CLAMPING FRAME

BACKGROUND OF THE INVENTION

This application is a continuation of application Ser. No. 430,058, filed Jan. 2, 1974, now abandoned.

The present invention relates to an arrangement for inserting utensils or similar small metallic parts into a clamping frame used for machining of the parts. The parts are taken from adjacently-lying stacks in a magazine. The clamping frame picks up the parts with the same spacing that they have on the stacks in the magazine.

Clamping frames of the preceding species are known in the art and have been under continuous improvement. With increase in size of the applicable machines, the number of parts has also increased, and thereby the number of parts to be taken by the clamping frame has also increased. Taking into account the increased speed in operation of the machine, the insertion of parts in the clamping frame has become important since such insertion of the parts has been performed manually for some time.

In one arrangement, known in the art, the lowest part in a stack is dropped out from beneath the magazine. Difficulties have been encountered thereby in dropping downward parts held at their ends, when such parts are of relatively different lengths. Such difficulties are particularly encountered when the inserting arrangement is of economical design. In addition, the parts which are dropped out and which are subjected to the entire load of the stack, may incur scratches through the relative motion of the member which serves to drop out the parts. Such scratches are then removed only with considerable difficulty, and the process is very time consuming.

Accordingly, it is an object of the present invention to provide an arrangement of the foregoing species, in which loading of the clamping frame may occur independent of the precise form of the parts.

Another object of the present invention is to provide an arrangement, as described, which operates rapidly and dependably without damaging the parts to be inserted in the clamping frame.

SUMMARY OF THE INVENTION

The objects of the present invention are achieved by providing an arrangement in which a gripper is lowered on the stack within the magazine. The gripper is provided with at least one gripping element for simultaneously gripping the upper parts of each stack. A retaining arrangement is provided for the clamping frame which, when open, takes from the gripper the parts in their longitudinal direction.

When the parts are made of ferromagnetic material, the gripping element can be in the form of magnetic means, preferably electromagnets. At the same time, individual gripping elements can be provided in the form of suction heads. These suction heads are, in a preferred design, connected to a suction pump in order to make the operation of the suction heads independent of the surface condition of the parts to be picked up. This applies particularly to parts which have engravings, for example, at the location where the parts are gripped by the suction heads.

In a particularly advantageous embodiment of the present invention, the gripper is constructed as a member which spans all stacks of the magazine, and which is movable up and down. A transfer arrangement operates between the gripper and the clamping frame. The movements and functional sequence or operation of the arrangement is preferably controlled in an automatic manner. At the same time, the closure of the loaded clamping frame can also be automatically accomplished.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
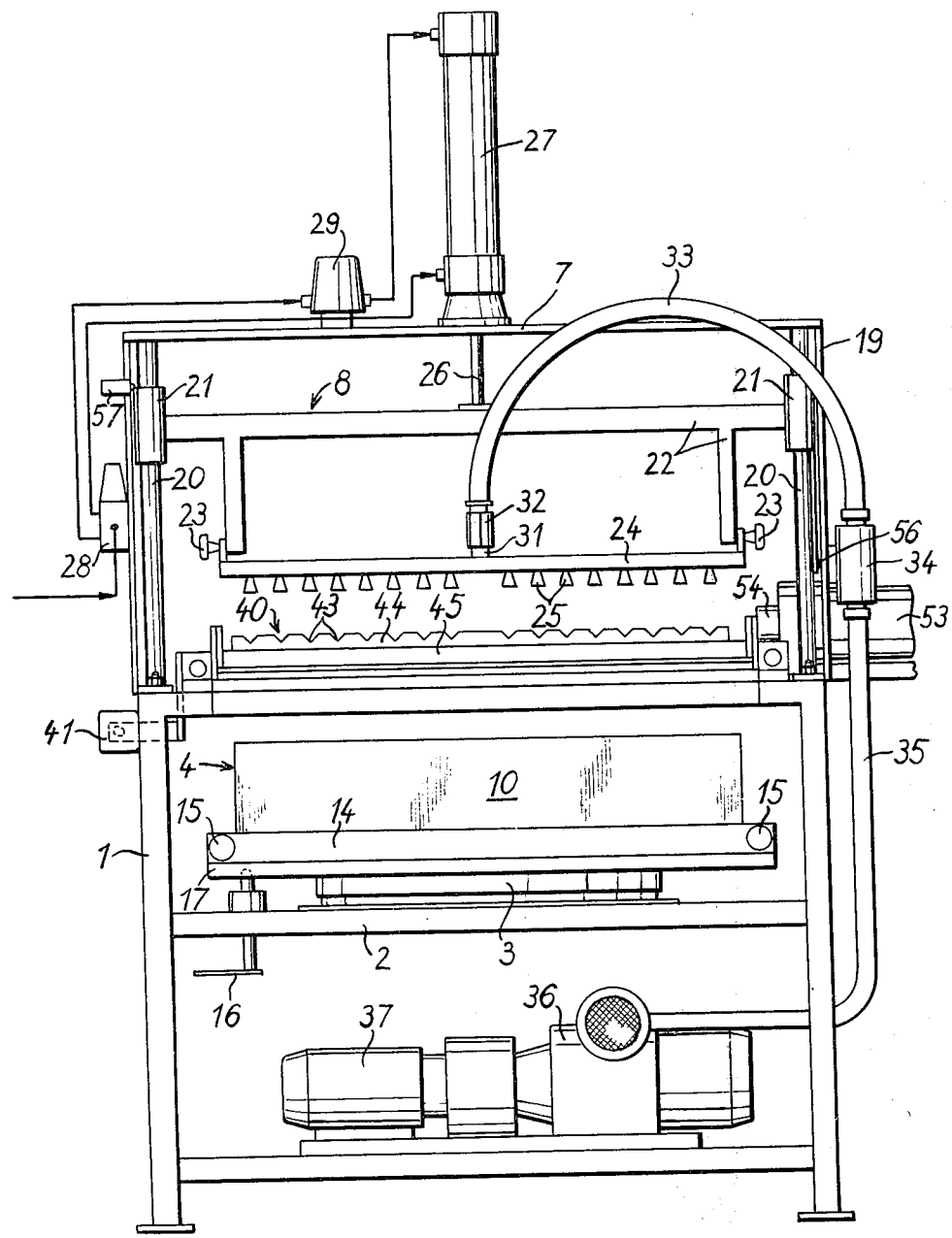
FIG. 1 is a front view of the arrangement, in accordance with the present invention, without a clamping frame.
Figure 2:
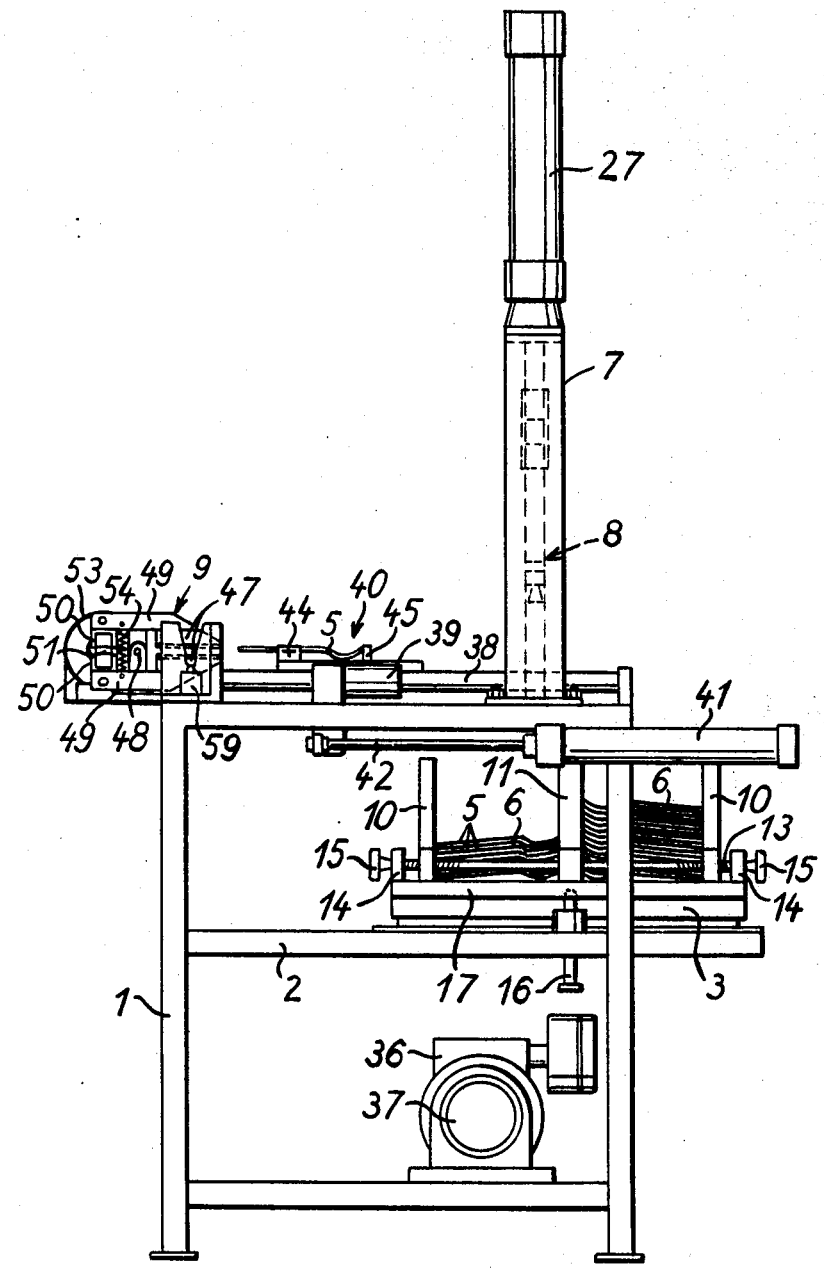
FIG. 2 is a side view of the arrangement of FIG. 1.
Figure 3:
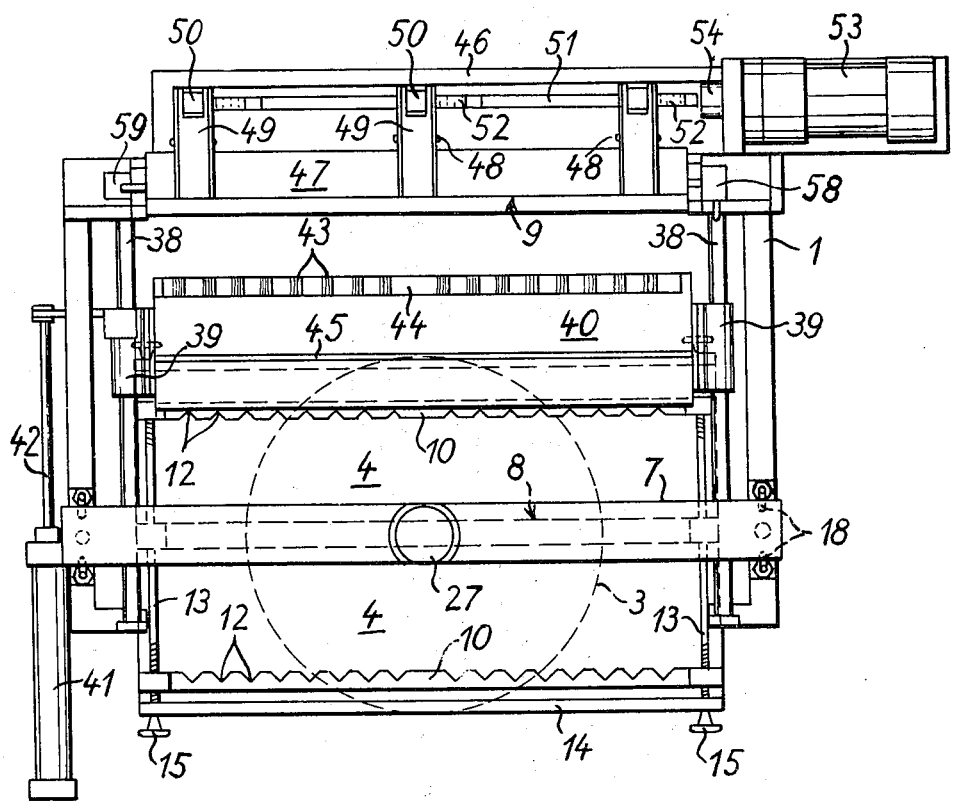
FIG. 3 is a plan view of the arrangement of FIG. 1 when including the clamping frame, but without the inserted parts.

Referring to the drawing, the arrangement shown in FIGS. 1 to 3 illustrate a structure or frame 1 which is at table-height. This frame or structure carries a rotatable platen 3 on an intermediate base 2. The rotatable platen 3 carries, in turn, two magazines or cartridges 4. The magazines 4 receive the parts 5 to be worked upon, in the form of adjacently lying stacks 6. The magazines 4 are arranged so that when the rotatable platen 3 rotates through an angle of substantially 180°, they are alternatingly brought into respective positions relative to a frame 7 which is mounted on the structure 1. The frame 7 receives the gripping arrangement 8.

The rotational platen 3 provides that the two magazines 4 are filled alternatively, and that they are alternatingly discharged through the gripping arrangement 8.

The rotational platen 3 can also accept a different number of magazines four, down to one, whereby an interruption during operation can be obtained, particularly during the loading process. A single magazine can also be moved in and out on the intermediate base 2 by means of guides or tracks, not shown. The selection of such means will finally not be determined on the basis of the time intervals required to load the tensioned frame 9 with the arrangement.

The frontal walls 10 and 11 of the magazines 4 have notches 12 for guiding the parts 5. The ends of the parts slip into the notches. In this manner, it is possible to set the magazine for receiving parts of different lengths. For this purpose, the walls 10 of both magazines may be adjusted in position by means of the threaded rod 13, relative to the wall 11 which is common to both magazines. It is to be understood here that the threaded rod 13 has opposite threads at both ends. These are held on the rotatable platen 3 in the bars 14. In addition, they carry the handwheel 15.

To fix the rotational platen in its two operating positions, a holding or indexing mechanism 16 (FIG. 1) is provided. This indexing mechanism consists of a spring-loaded bolt member which may be withdrawn by hand, and which projects normally in a corresponding recess on the underside of the base plate 17 of the two magazines 4.

The frame 7 is mounted on the upper side of the structure 1, and may be displaced relative to the magazines 4, by means of the elongated openings 18, as shown in FIG. 3. The configuration of frame 7 is best seen in FIG. 1, where it shows that the frame has guide rods 20 along both of its side members 19. Bearing elements 21 slide on the guide rods 20. These bearings are, furthermore, interconnected through a carrying frame 22, to which is attached, a rectangular-shaped tube member 24 by means of thumb screws 23 at the end of the frame 22. The rectangular-shaped tube member 24 is closed at the ends. The tube 24 is, furthermore, pivotable about the screws 23, and has individual gripping elements in the form of suction heads 25, one for each stack 6 of the magazine below. The frame 22, rectangular-shaped tube 24, and suction head 25 form a gripping arrangement 8 which may be raised and lowered along the guide rods 20.

In order to provide the motion for the frame 22 a double acting air cylinder 27 is provided with a piston 26 which is brought against the frame 22 at its center. The air cylinder 27 rests on the upper side of the frame 7, and as shown schematically in the drawing. The piston 26 may be actuated through the operation of a magnetic valve 28 in combination with a pressure monitor 29. This pressure monitor serves to reverse the operation of cylinder 27, as soon as the piston 26 experiences a predetermined displacement resistance in its downward motion through the suction heads 25 in contact with the stacks 6.

Figure 4:
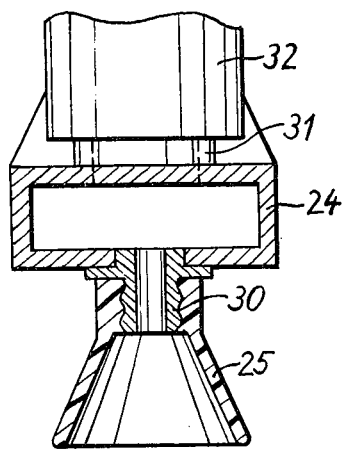
FIG. 4 is a sectional view through a suction head used as a gripping element together with a carrier.

As may be seen from FIG. 4, the suction heads 25 are mounted on a hollow nipple 30 whose interior communicates with the interior of the tube or pipe 24. A connection 31 prevails on the tube 24 at substantially its center. A vacuum hose 33 is provided to the connection 31, through a coupling 32. The hose 33 is connected to a vacuum pump 36 through a two-way valve 34 and a line 35. The vacuum pump 36 is driven by an electrical motor 37.

Guide rods 38, shown in FIGS. 2 and 3 are arranged on the upper side of the structure 1 and below the frame 7 in longitudinal direction of the magazines 4 which store the parts 5. A transfer arrangement is slidable along these guide bars 38 by means of bearings 39. The transfer arrangement is designated by the reference numeral 40, and is driven by a double-acting air cylinder 41 mounted on the side of the structure 1. The air cylinder 41 has a piston 42 which connects with one of the bearings 39.

The task of the transfer arrangement 40 is to insert into the waiting tentering frame 9, the parts which have been taken in longitudinal direction by the gripping arrangement 8 from the respective magazine 4. The frame 9 receives these parts with the same spacing between each other, as they were in the stack 6 in the magazine. For this purpose the transfer arrangement 40 has individual retaining means for the parts in the form of notches 43, as shown in FIG. 1, and these notches run in a transverse bar 44. An abutment in the form of another bar 45, serves to direct the ends of the prts received by the notches 43.

The frame 9 which is shown only in exemplary form, is received by a retaining arrangement 46 which gives the frame 9 a predetermined position with respect to the structure 1. The construction of the retaining arrangement, for this purpose, is matched to the prevailing requirements. The frame 9 itself is constructed in the form of a pair of tongues, as shown in particulr in FIG. 2. To receive the handles of the parts 5 which are in this case forks, the frame 9 is provided with fingers 49 joined by the hinge 48 and having clamping jaws 47 covered with rubber or similar material for providing the gripping sufaces. At their back ends, the fingers 49 have a guiding arrangement for receiving a transverse wedging rod 51. This wedging rod 51 has at correspondingly spaced positions, wedge-shaped projections 52, so that upon longitudinal displacement within the guiding arrangement 50, the rear ends of the pair of fingers 49 are spread apart and the clamping jaws 47 are correspondingly brought together. An air cylinder 53 is arranged on an extension of the side of the retaining arrangement 46, automatically close the frame 9. The air cylinder 53 has a piston 54 which acts upon directly the end of the wedging rod 51. This air cylinder can also be double-acting or it can also have a return spring. When the wedging rod is retracted, the frame 9 is held open by a spring 55, in order to make possible the insertion of parts 5, without difficulty, with respect to the transfer arrangement 40.

By controlling the valve 34 (FIG. 1) by cam 56 on the neighboring bearing 21, the suction heads 25 are brought into communication with the vacuum pump 36 when the gripping arrangement 8 is lowered. When reaching the upper point or limit of travel, and the transfer arrangement 40 is directly underneath, the suction heads release the parts 5 so that they may drop into the transfer arrangement.

A cam switch 57 actuated by the other bearing 21 serves to hold still the gripping arrangement at its upper position limit, through the magnetic valve 28, and to position the transfer arrangement, at the same time, in readiness for a new operating cycle. A cam switch 58 (FIG. 3) actuated by the transfer arrangement operates in a similar manner, in the region of the frame 9 to reverse the transfer arrangement and simultaneously actuate the cylinder 53 to close the frame 9. A further cam switch 59 enters the retaining arrangement 46 upon insertion of a frame 9 in order to provide automatically a loading process which terminates with the closure of the frame 9. All of these functions occur evidently, of course, through further magnetic valves, connecting lines and the like, not shown, which may be readily selected and arranged by those skilled in the art without difficulty to meet the prevailing specific requirements. For this reason, the control means and interconnecting lines are essentially shown only schematically in FIG. 1.

In place of the suction heads 25 which are shown connected to a vacuum pump in the drawing, it is also possible to obtain the suction effect in the conventional manner through the form and elasticity of suction cups, for example. When such a suction cup arrangement is desired, they cooperate with a stripper in the form of a fixed abutment which separates the parts 5 shortly before the gripping arrangement reaches its upper displacement limit. With such suction cups, the problem arises with respect to obtaining dependable suction effect. This is particularly true when the parts to be picked up have engravings, for example, at the positions where they are to be gripped by the suction cups. It is also important to be aware, at the same time, that the suction cups can generally not grip the parts in the region of their center of gravity, and even then encounter only substantially small gripping surfaces, as in the case of forks, for example. An arrangement with external suction, as described, however, has been found useable in all practical cases.

Figure 5:
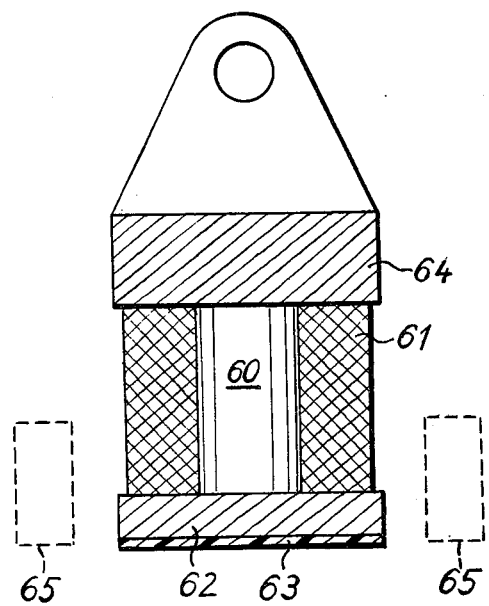
FIG. 5 is a sectional view through a gripping element in the form of an electromagnet, in accordance with the present invention.

It is possible to use magnetic elements for the gripping members, when the parts to be processed are made of ferromagnetic parts. FIG. 5 shows, for this purpose, an electromagnet with essential parts in the form of a single magnetic core 60, coils 61, as well as a common actuator 62 in the form of a magnetic member or armature. For purposes of protecting the parts picked up at their gripping surfaces, a protective covering 63 made of felt or rubber, for example, is applied to the member 62. The individual cores 60 are carried by a bar 64 which is also preferably made of ferromagnetic material. This bar 64 may be brought against the carrying frame 22, in a manner similar to that described above with respect to the rectangular shaped tube 24. In the place of individual cores 60 and coils 61, an extending core with a corresponding coil can also be provided. At the same time, individual cores 60 can also carry individual actuators or armatures 62, and the individual magnetic elements formed in this manner can then be suspended with springs from the bar 64. With this arrangement different heights of individual stacks of each magazine may be evened out. This also applies to the suction heads or suction cups above. It is also possible to use permanent magnets in the place of electromagnets which are controlled in a manner corresponding to the suction heads 25. Such permanent magnets, however, require a stripper as denoted by the elements 65 in FIG. 5. Finally, the transfer arrangement 40 can be omitted when, in its place, the retaining arrangement 46 with frame 9 or frame 7 with gripping arrangement 8, is made movable. Cylinders 53 or 17 must then be supplied by hoses.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. An arrangement for inserting substantially elongated parts to be machined in a clamping frame comprising, in combination, magazine means having adjacently-lying stacks of parts to be machined; gripping means movable downward on said stacks in said magazine means, and having at least one gripping element for gripping simultaneously the upper parts in each stack; a clamping frame with support means cooperating with said gripping means for taking, when open, parts in their longitudinal directions after having been picked up by said gripping means, the uppermost parts in said stack being gripped simultaneously in unison by said gripping means and placed simultaneously in said clamping frame for becoming machined; transfer means between said gripping means and said clamping frame for transferring said parts when said gripping means and said clamping frame are stationary; means for moving said magazine means with respect to said gripping means in a loading position of said magazine means, said magazine means havng a displaceable frontal wall corresponding to the length of said parts; a rotatable platen for supporting at least two magazine means; said gripping means comprising a movable up-and-down member, said gripping means having gripping elements comprising suction heads; a suction pump with control valve means connected to said suction heads; means for displacing and interchanging said suction heads; drive means for automatically closing said clamping means; and means for automatically controlling the motion and sequential operation of at least part of said arrangement.

2. An arrangement for inserting substantially slim elongated parts, such as cutlery parts, into a clamping frame for machining said parts, comprising, in combination, magazine means for receiving a plurality of stacks of said parts in a side-by-side arrangement with respect to the longitudinal direction of said parts; gripping means movable upwards and downwards on said stacks in said magazine means and having at least one gripping element for gripping and lifting simultaneously in unison the upper parts of each stack; at least on clamping frame for receiving when open the lifted parts in the same side-by-side arrangement as said parts are held by said gripping means, said clamping frame having closure means for closing said clamping frame after receiving said parts; support means for receiving and supporting said clamping frame in predetermined position; and transfer means for transferring the lifted parts horizontally from a position above said stacks within said magazine means to a clamping position within said clamping frame on said support means.

3. The arrangement as defined in claim 2 including means for moving said magazine means with respect to said gripping means in a loading position of said magazine means.

4. The arrangement as defined in claim 2 wherein said magazine means has a displaceable frontal wall corresponding to the length of said parts.

5. The arrangement as defined in claim 2 including a rotatable platen for supporting at least two magazine means.

6. The arrangement as defined in claim 2 wherein said gripping means has gripping elements comprising suction heads.

7. The arrangement as defined in claim 6 including a suction pump with control valve means connected to said suction heads.

8. The arrangement as defined in claim 6 including means for displacing and interchanging said suction heads.

9. The arrangement as defined in claim 2 wherein said gripping element comprises magnetic means.

10. The arrangement as defined in claim 9 including protective covering means over the gripping surface of said magnetic means for protecting the articles to be gripped.

11. The arrangement as defined in claim 2 including drive means for automatically closing said clamping means.

12. The arrangement as defined in claim 2 including means for automatically controlling the motions and sequential operation of at least part of said arrangement.

13. An arrangement for inserting substantially elongated parts to be machined in a clamping frame comprising, in combination, magazine means having adjacently-lying stacks of parts to be machined; gripping means movable downward on said stacks in said magazine means, and having at least one gripping element for gripping simultaneously the upper parts in each stack; a clamping frame with support means cooperating with said gripping means for taking, when open, parts in their longitudinal direction after having been picked up by said gripping means, the uppermost parts in said stack being gripped simultaneously in unison by said gripping means and placed simultaneously in said clamping frame for becoming machined; transfer means between said gripping means and said clamping frame for transferring said parts when said gripping mear and said clamping frame are stationary; means for moving said magazine means with respect to said gripping means in a loading position of said magazine means, said gripping means comprising a movable up- and-down member, and means for automatically controlling the motion and sequential operation of at least part of said arrangement.

* * * * *